(12) United States Patent
Counterman

(10) Patent No.: US 9,218,503 B2
(45) Date of Patent: Dec. 22, 2015

(54) COLLECTION AND ANALYSIS OF CUSTOMER DATA FROM APPLICATION PROGRAMMING INTERFACE USAGE

(71) Applicant: Verizon Patent and Licensing Inc., Basking Ridge, NJ (US)

(72) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 13/949,642

(22) Filed: Jul. 24, 2013

(65) Prior Publication Data
US 2015/0033330 A1  Jan. 29, 2015

(51) Int. Cl.
*H04L 29/00* (2006.01)
*G06F 21/62* (2013.01)
*H04W 12/08* (2009.01)
*H04W 4/02* (2009.01)
*H04W 12/02* (2009.01)

(52) U.S. Cl.
CPC ........... *G06F 21/6245* (2013.01); *H04W 12/08* (2013.01); *H04W 4/02* (2013.01); *H04W 12/02* (2013.01)

(58) Field of Classification Search
CPC .............. H04L 9/32; H04L 9/00; H04L 29/06
USPC ..................................................... 726/10, 20
See application file for complete search history.

(56) References Cited

U.S. PATENT DOCUMENTS

| 8,103,445 B2 * | 1/2012 | Smith et al. .................... 701/425 |
| 2012/0174208 A1 * | 7/2012 | Sperling et al. ................. 726/10 |

* cited by examiner

*Primary Examiner* — Jeffrey Pwu
*Assistant Examiner* — Michael D Anderson

(57) ABSTRACT

A device may receive a request for analytics information associated with a user device. The device may retrieve application programming interface (API) information associated with the request for analytics information. The API information may include information associated with providing an authorization token and with providing user device information. The device may determine demographic information based on the request for analytics information. The demographic information may be associated with a user of the user device. The device may determine the analytics information based on an analysis of the API information and the demographic information. The device may provide the analytics information.

20 Claims, 13 Drawing Sheets

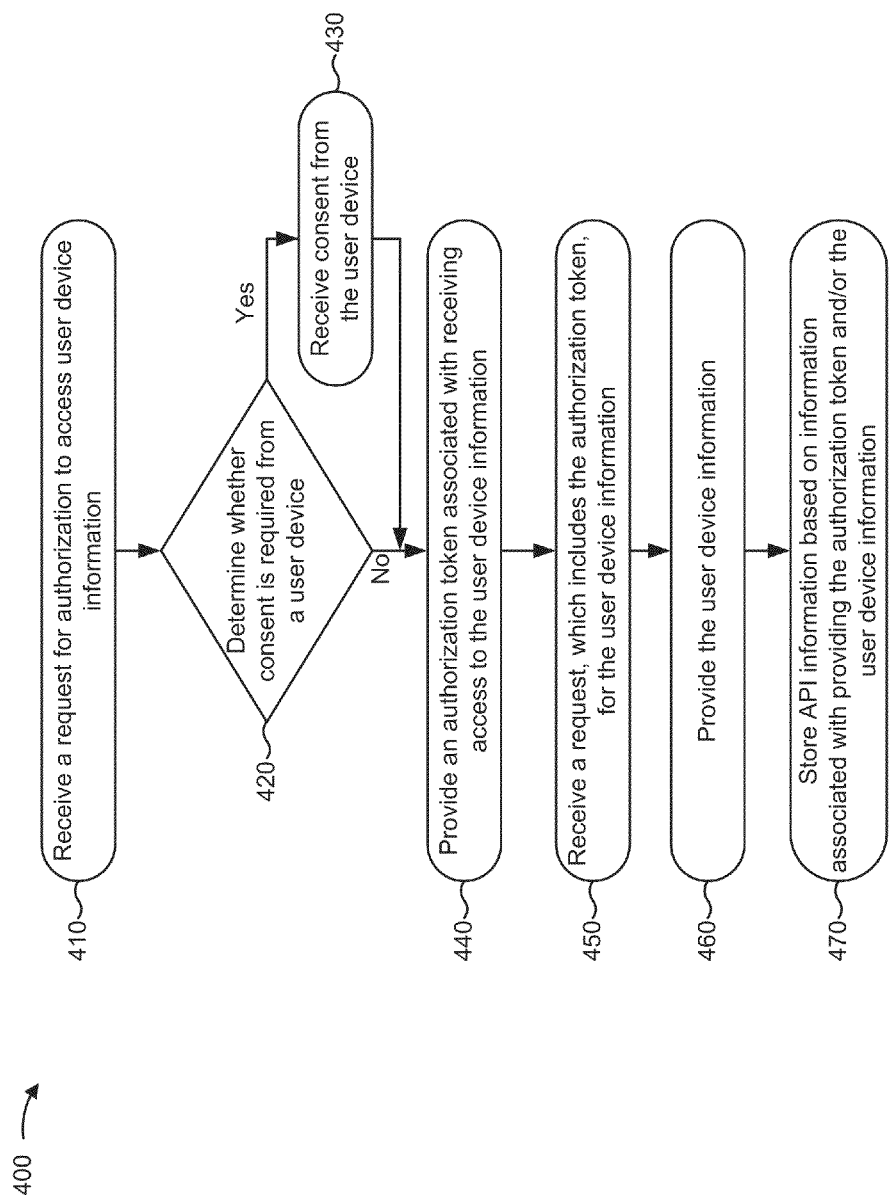

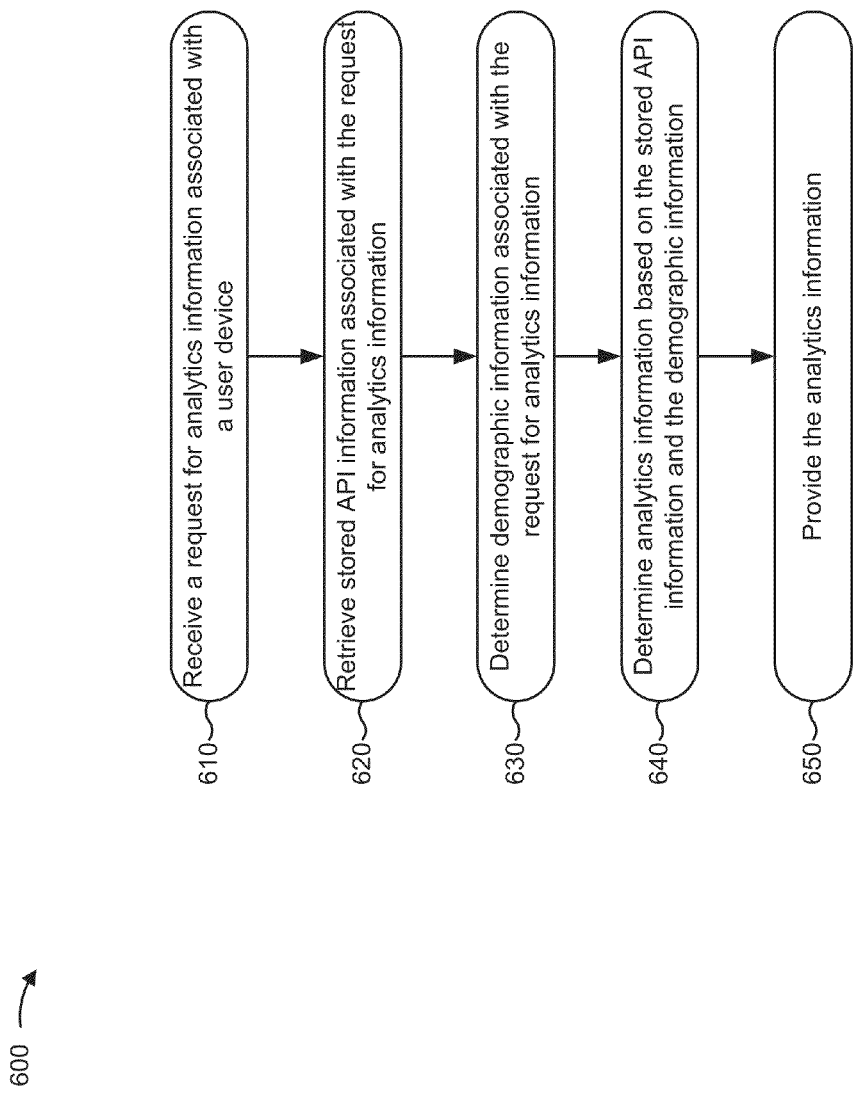

COLLECTION AND ANALYSIS OF CUSTOMER DATA FROM APPLICATION PROGRAMMING INTERFACE USAGE

BACKGROUND

An application programming interface (API) may require registration and authorization by an application device prior to providing permission to collect user device information from a user device utilizing the API. Upon request, an API gateway may gather information from a user device and provide the information to a registered, authorized application device.

BRIEF DESCRIPTION OF THE DRAWINGS

FIG. 4 is a flow chart of an example process for gathering API information associated with a request for user device information;

FIG. 6 is a flow chart of an example process for providing analytics information based on API information and subscriber information.

DETAILED DESCRIPTION

The following detailed description of example implementations refers to the accompanying drawings. The same reference numbers in different drawings may identify the same or similar elements.

An API may specify how an application device may communicate and/or receive information from an API gateway. An API gateway may register and authorize the application device seeking to access user device information (e.g., via the API), such as location information, network usage information, calendar information, or the like. Registration and authorization may include providing information to the API gateway to authenticate the application device. The API gateway may receive requests for user device information from registered, authorized application devices, and may complete a requested transaction by gathering and providing the requested user device information. Implementations described herein may assist an API gateway in providing customer data analytics by using information associated with providing authorization and/or user device information as well as demographic information.

Figure 1:
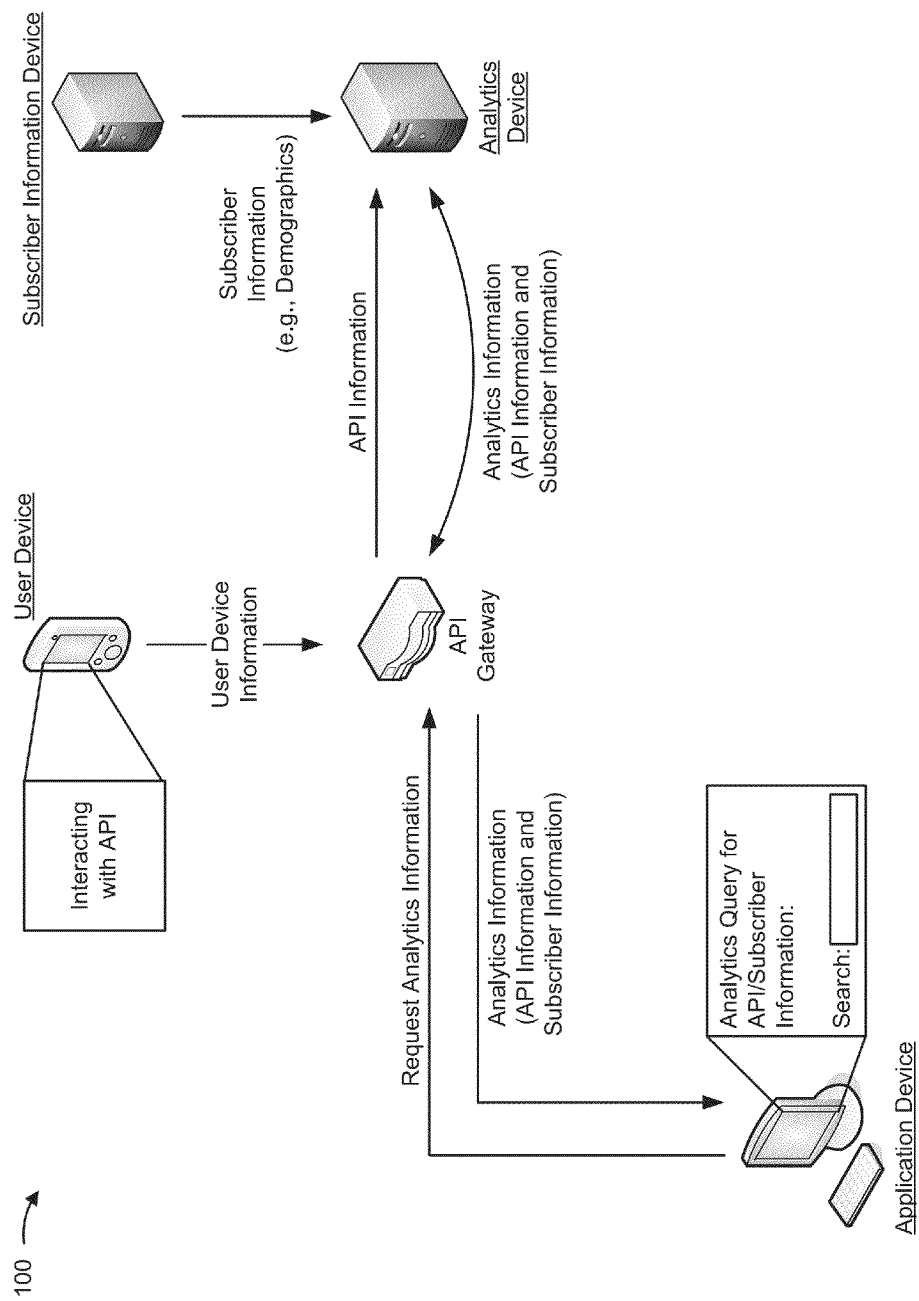
FIG. 1 is a diagram of an overview of an example implementation described herein.

FIG. 1 is a diagram of an overview of an example implementation 100 described herein. Example implementation 100 may include an application device, an API gateway, a user device, an analytics device, and a subscriber information device. As shown in FIG. 1, the API gateway may receive a request, from the application device, for analytics information associated with the user device. The API gateway may query the analytics device to receive analytics information associated with the user device. Analytics information may be determined based on subscriber information (e.g., demographics information) and API information (e.g., information associated with usage of an API interface to gather user device information). The analytics device may query a subscriber information device (e.g., a home subscriber server (HSS), a home location register (HLR), a demographic database server, etc.) to receive demographic information associated with the user device (e.g., payment information, contact information, etc.). API information may refer to information, such as authorization information and transaction information, which may be gathered based on usage of an API interface, and/or selectively stored by the analytics device based on relevancy criteria, such as the type of the information, the source of the information, the quantity of requests for the information, or the like.

Authorization information may refer to information collected when an application device requests authorization to collect user device information (e.g., information associated with a user of a user device, information associated with a subscriber of a user device, information associated with the user device, etc.). The API gateway may gather information associated with authorization, such as information identifying the application device, information identifying the type of user device information requested, consent information (e.g., information associated with gathering consent from the user device for user device information to be accessed), or the like. The API gateway may provide the authorization information to the analytics device for processing and/or storage as API information.

Transaction information may refer to information collected when an application device requests user device information. The API gateway may gather the requested user device information, such as by querying a server, querying the user device, or the like. The API gateway may provide the user device information to the application device, and may provide transaction information to the analytics device for processing and/or storage as API information. The transaction information may include information associated with fulfilling the request for user device information, such as information identifying the requesting application, the user device information, a timestamp, or the like.

As further shown in FIG. 1, the analytics device may provide analytics information to the API gateway, and the API gateway may provide the analytics information to the application device for display to a user, for further processing, etc. In this way, the API gateway may collect API information from authorization of an application device and from a transaction for user device information, and may combine the API information with demographic information to provide analytics information.

Figure 2:
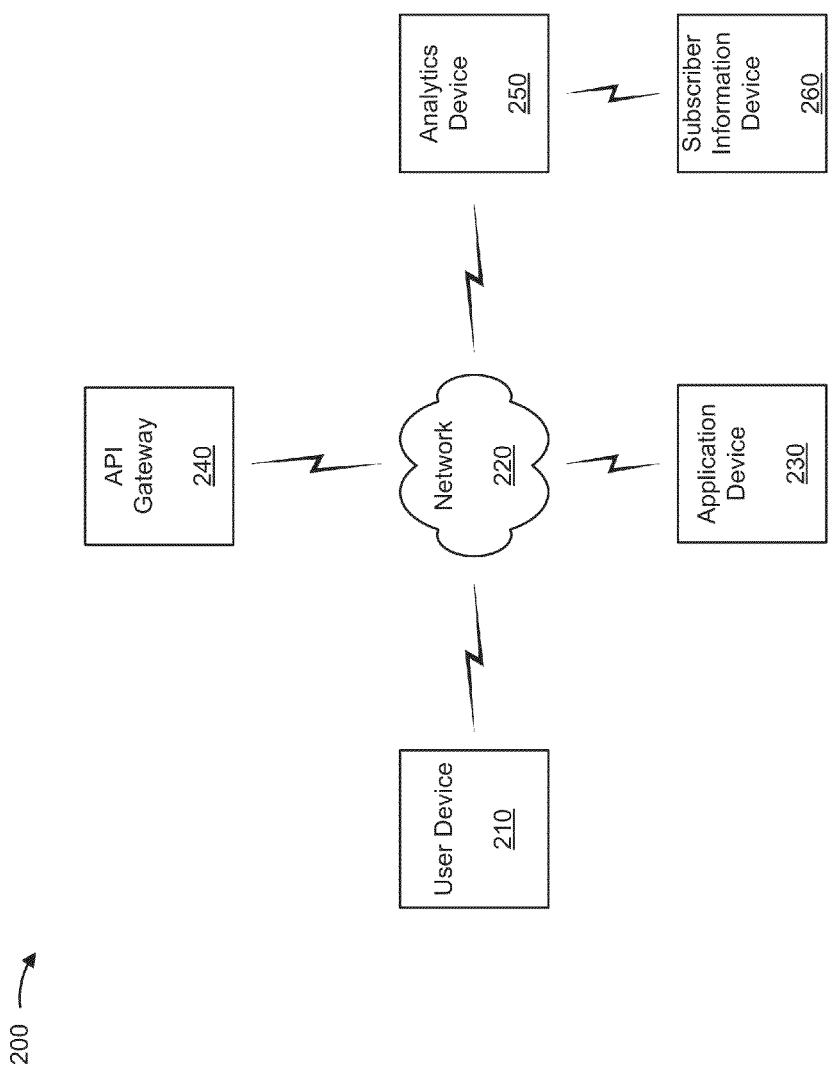
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a network 220, an application device 230, an API gateway 240, an analytics device 250, and a subscriber information device 260. Devices of environment 200 may interconnect via wired connections, wireless connections, or a combination of wired and wireless connections.

User device 210 may include one or more devices capable of connecting to network 220 and providing user device information. For example, user device 210 may include a mobile phone (e.g., a smart phone), a radiotelephone, a personal communications system (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a personal gaming system, and/or another similar type of device. In some implementations, user device 210 may include one or more computing programs associated with application device 230 (e.g., an application, an "app", etc.). In some implementations, user device 210 may be capable of providing user device information to API gateway 240, such as location information, data usage information, application usage information, user information (e.g., contact information, calendar information, reminder information, photograph library information, etc.), or the like, that may be processed and/or stored as API information by analytics device 250.

Network 220 may include one or more wired and/or wireless networks. For example, network 220 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, network 220 may include one or more connections between user device 210, application device 230, API gateway 240, analytics device 250, and/or subscriber information device 260.

Application device 230 may include one or more devices capable of requesting and receiving analytics information associated with user device 210. In some implementations, application device 230 may be associated with a computing program used by user device 210. For example, application device 230 may include a server associated with supporting mobile applications. In some implementations, application device 230 may include one or more devices configured to request and receive information from API gateway 240 (e.g., via network 220). In some implementations, application device 230 may include an application being operated on another device (e.g., on user device 210, on a server device, etc.), a device (e.g., a server) associated with an application being operated on another device (e.g., on user device 210, on another server, etc.), a device accessing an API interface via an API gateway, or the like.

API gateway 240 may include one or more devices capable of receiving, generating, processing, storing, and/or providing information associated with user device 210, such as an authorization to gather user device information, analytics information, or the like. For example, API gateway 240 may include a gateway, a server, a router, a hub, a switch, a bridge, etc. capable of receiving a request for information, processing the request, and retransmitting the request to a destination device, such as user device 210 (e.g., for user device information, such as location information, data usage information, or the like), analytics device 250 (e.g., for analytics information), or the like. In some implementations, API gateway 240 may provide an interface for requesting and receiving information, such as an API.

Analytics device 250 may include one or more devices capable of receiving, generating, processing, storing, and/or providing information associated with user device 210. In some implementations, analytics device 250 may store authorization information and/or transaction information. Additionally, or alternatively, analytics device 250 may generate and/or provide analytics information. For example, analytics device 250 may include a server capable of generating analytics information by processing information provided by API gateway 240 (e.g., via network 220). In some implementations, analytics device 250 may request and receive demographic information from another device, such as subscriber information device 260.

Subscriber information device 260 may include one or more devices capable of receiving, generating, processing, storing, and/or transmitting demographic information associated with the user of user device 210, such as user identification information (e.g., a user name, a user age, a user gender, a user contact address, etc.), user preference information (e.g., mobile device purchasing information, payment information, etc.), or the like. For example, subscriber information device 260 may include an HSS, a user profile server function (UPSF), an HLR, an authentication center (AuC), a demographic database server, or the like.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while API gateway 240 and analytics device 250 are shown as separate devices, API gateway 240 and analytics device 250 may be implemented in a single device. Additionally, one or more of the devices of environment 200 may perform one or more functions described as being performed by another one or more devices of environment 200.

Figure 3:
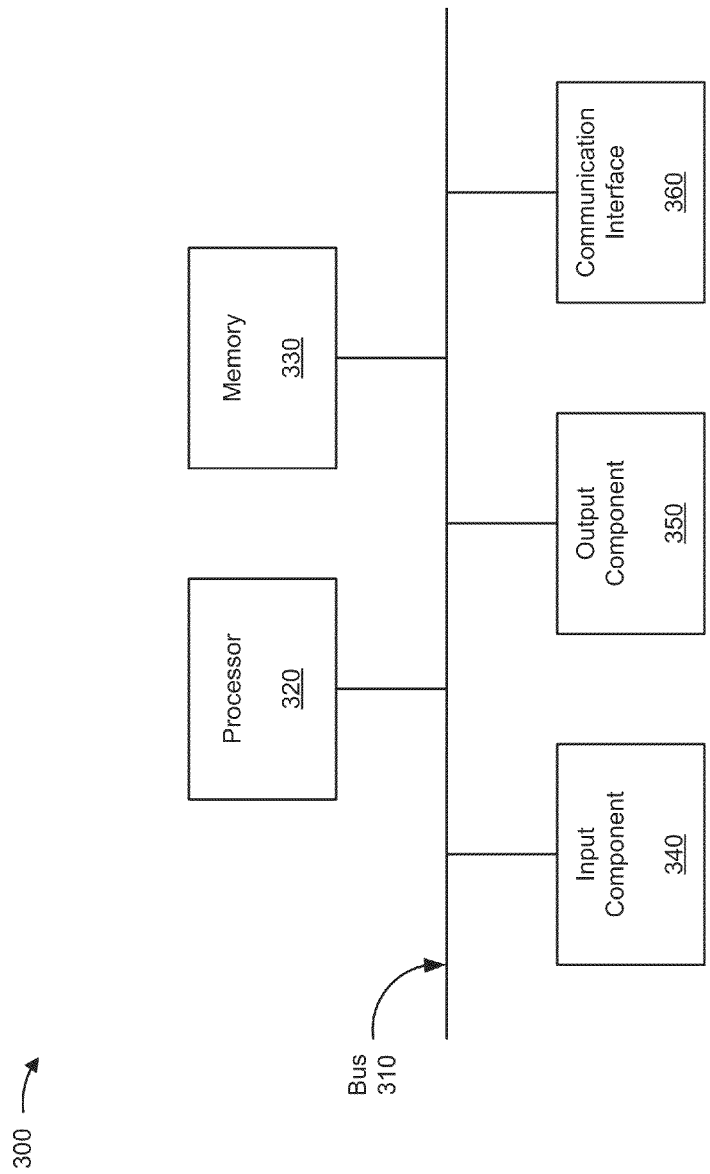
FIG. 3 is a diagram of example components of one or more devices of FIG. 2.

FIG. 3 is a diagram of example components of a device 300. Device 300 may correspond to user device 210, application device 230, API gateway 240, analytics device 250, and/or subscriber information device 260. In some implementations, each of user device 210, application device 230, API gateway 240, analytics device 250, and/or subscriber information device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

FIG. 4 is a flow chart of an example process 400 for gathering API information associated with a request for user device information. In some implementations, one or more process blocks of FIG. 4 may be performed by API gateway 240. Additionally, or alternatively, one or more process blocks of FIG. 4 may be performed by another device or a group of devices separate from or including API gateway 240, such as user device 210, application device 230, analytics device 250, and/or subscriber information device 260.

As shown in FIG. 4, process 400 may include receiving a request for authorization to access user device information (block 410). For example, API gateway 240 may receive an authorization request from application device 230 to access user device information associated with user device 210. User device information may include information associated with a user of user device 210 (e.g., a subscriber), such as identification information, payment information, or the like, and/or information associated with user device 210, such as a location, a data usage, a browsing history, a contact list, a network traffic usage, an application usage, storage information (e.g., information associated with data stored using user device 210, such as music storage data, photographic storage data, message storage data, or the like), calendar information, or the like.

In some implementations, API gateway 240 may register application device 230 as a registered application device. For example, API gateway 240 may gather information associated with application device 230, such as an identity, a server and/or application location, a network address, or the like. In some implementations, API gateway 240 may determine information to be accessed by application device 230. For example, API gateway 240 may identify particular user device information (e.g., a type of user device information) that is to be gathered for application device 230.

API gateway 240 may determine that user device information is to be gathered from a particular user device 210, in some implementations. For example, application device 230 may provide information identifying the particular user device 210, such as a phone identifier, a mobile device identifier, a universal resource indicator (URI), a universal resource locator (URL), an international mobile subscriber identity (IMSI), or the like.

As further shown in FIG. 4, process 400 may include determining whether consent is required from a user device (block 420). For example, API gateway 240 may determine whether consent is required from a user of user device 210 (e.g., the user device 210 that is associated with the user device information) to authorize application device 230 to access the user device information. In some implementations, API gateway 240 may determine whether consent is required based on the requested user device information. For example, API gateway 240 may require consent before allowing application device 230 to access a particular type of user device information (e.g., a location, a contact list, etc.) associated with user device 210. Additionally, or alternatively, API gateway 240 may determine whether consent is required based on a stored user device identifier. For example, user device 210 may indicate, prior to the request for authorization, that all requests to access user device information from user device 210 require consent. In this case, API gateway 240 may associate the indication with a user device identifier (e.g., associated with user device 210) and require consent when application device 230 requests to access user device information.

As further shown in FIG. 4, if consent is required from the user device (block 420—YES), then process 400 may include receiving consent from the user device (block 430). For example, API gateway 240 may receive consent from user device 210, and may provide the authorization token as discussed herein in connection with block 440.

API gateway 240 may receive consent from user device 210 based on a saved preference, in some implementations. For example, user device 210 may provide advance consent regarding particular user device information. Additionally, or alternatively, API gateway 240 may receive consent based on querying user device 210. For example, API gateway 240 may send consent information (e.g., information identifying the user device information that is being requested, the identity of the requester, etc.) to user device 210, and a user of user device 210 may provide consent (e.g., by providing input to user device 210). Additionally, or alternatively, API gateway 240 may receive consent from the user of user device 210 via another platform. For example, API gateway 240 may receive consent via an email authorization, a telephone authorization, etc.

As further shown in FIG. 4, once consent has been received (block 430), or if consent is not required from the user device (block 420—NO), then process 400 may include providing an authorization token associated with receiving access to the user device information (block 440). For example, API device 240 may provide the authorization token, permitting application device 230 to access the user device information. An authorization token may refer to a user-specific query authorization containing one or more parameters, such as an authorization token address identifier, an API device identifier, a validity period identifier, or the like. In some implementations, the authorization token may include information associated with the user device information request. For example, the authorization token may include information identifying the requester (e.g., an application device identifier), the requested user device information, user device 210, etc. In some implementations, the authorization token may include information allowing application device 230 to request user device information directly from user device 210 (e.g., without using API gateway 240 as an intermediary). Additionally, or alternatively, the authorization token may include information allowing application device 230 to request user device information via API gateway 240.

API gateway 240 may provide an authorization token that is valid for a particular period of time, in some implementations. For example, API gateway 240 may provide an authorization token that expires after the particular period of time elapses. In some implementations, API gateway may provide a permanent authorization token to application device 230.

Additionally, or alternatively, API gateway 240 may provide an authorization token to application device 230 that is valid until user device 210 invalidates the authorization token (e.g., by revoking consent).

API gateway 240 may determine the period of validity associated with the authorization token based on the user device information, in some implementations. For example, API gateway 240 may provide an authorization token to access location information that is valid for a first period of time, and an authorization token to access usage information that is valid for a second period of time. Additionally, or alternatively, API gateway 240 may determine the period of validity based on user device 210. For example, a first user device 210 may allow an authorization token to be valid for a first period of time, and a second user device 210 may allow an authorization token to be valid for a second period of time. Additionally, or alternatively, API gateway 240 may determine the period of validity based on application device 230. For example, API gateway 240 may provide an authorization token that is valid for a first period of time to a first application device 230 and may provide an authorization token that is valid for a second period of time to a second application device 230.

As further shown in FIG. 4, process 400 may include receiving a request, which includes the authorization token, for the user device information (block 450). For example, API gateway 240 may receive a request for the user device information, from application device 230, that includes the authorization token. In some implementations, API gateway 240 may process the authorization token to confirm that the authorization token is valid. For example, API gateway 240 may confirm that the authorization token has not expired.

As further shown in FIG. 4, process 400 may include providing the user device information (block 460). For example, API gateway 240 may provide the requested user device information to application device 230. In some implementations, API gateway 240 may provide the user device information by sending the request to user device 210 (e.g., via network 220). For example, API gateway 240 may determine information, such as location information, application usage information, or the like, by querying user device 210. In this case, user device 210 may provide API gateway 240 with a record of information provided directly to application device 230. Additionally, or alternatively, user device 210 may provide the user device information to API gateway 240 for distribution to application device 230. In some implementations, API gateway 240 may provide the user device information by querying another device, such as a server, a base station, or the like. For example, API gateway 240 may provide user device information, such as network access usage, network traffic usage, or the like, by querying a mobility management entity and providing the user device information to application device 230.

As further shown in FIG. 4, process 400 may include storing API information based on the information associated with providing the authorization token and/or the user device information (block 470). For example, API gateway 240 may store API information and/or may provide API information to analytics device 250 for storage. API information may refer to information stored based on gathering and/or processing information associated with providing the authorization token and/or the user device information.

API information may include authorization information (e.g., information associated with authorizing application device 230 to access user device information), in some implementations. For example, authorization information may include identity information, such as an application device identifier (e.g., a server identifier, an embedded application location identifier, etc.), a user device identifier, and/or a user device information type identifier (e.g., information identifying the requested user device information, such as a location, a usage, a network traffic type, etc.). Additionally, or alternatively, authorization information may include authorization token information, such as consent information (e.g., whether consent was required, how consent was provided, how long consent is valid, etc.), authorization token information (e.g., when the authorization token was requested, how long the authorization token is valid, how long the authorization token has been active, etc.), or the like.

API information may include transaction information (e.g., information associated with the request for user device information), in some implementations. For example, transaction information may include the user device information, such as location information, application usage information, contact information, calendar information, or the like. Additionally, or alternatively, transaction information may include information associated with providing the user device information, such as a time at which the information was provided, a requester identifier (e.g., information identifying application device 230), other user device information (e.g., available user device information that was not requested by application device 230, such as location information when application device 230 has requested usage information), application information (e.g., information gathered about the application device requesting the user device information), or the like.

Authorization information and/or transaction information may be processed prior to storage as API information, in some implementations. For example, information may be rejected from storage based on the type of information (e.g., location information may be permitted, but identity information may be rejected), the quantity of information (e.g., location information, such as global positioning system (GPS) coordinate information, may have digits trimmed to reduce storage size), or the like.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
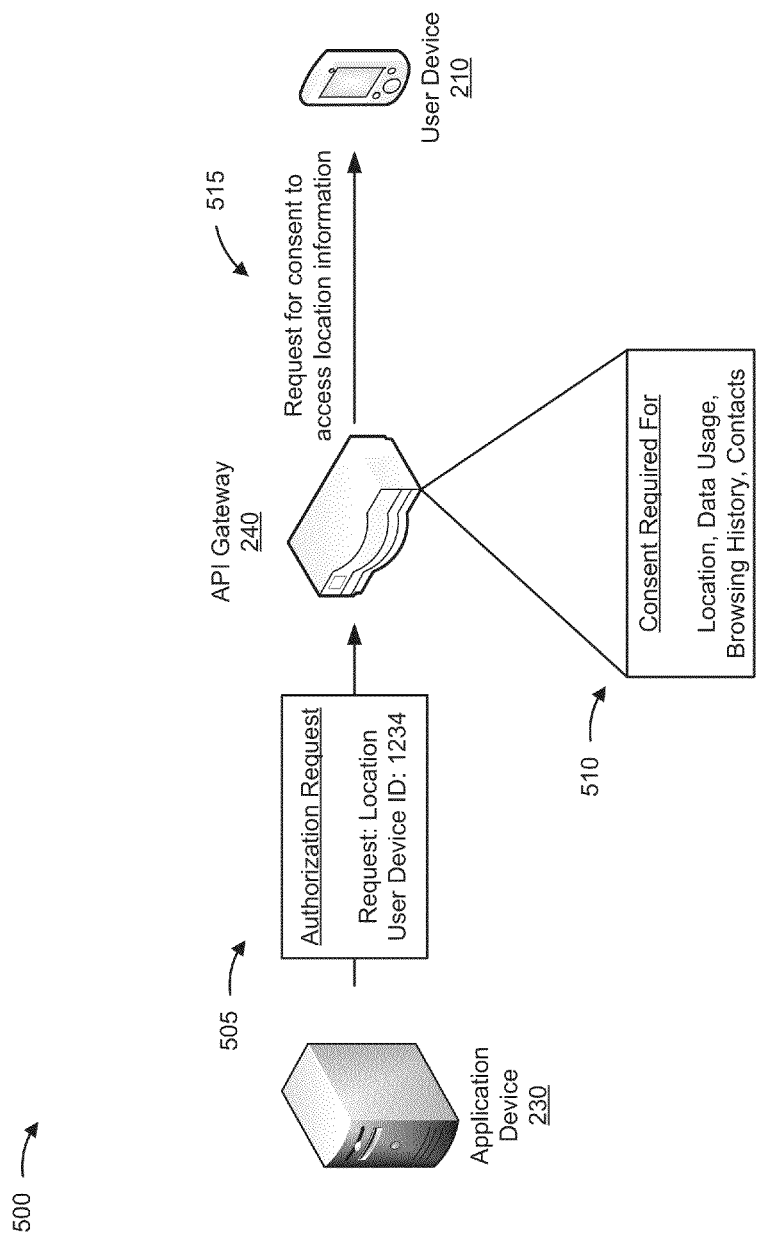
FIGS. 5A-5D are diagrams of an example implementation relating to the example process shown in FIG. 4.

FIGS. 5A-5D are diagrams of an example implementation 500 relating to process 400 shown in FIG. 4. As shown in FIG. 5A, and by reference number 505, application device 230 sends an authorization request to API gateway 240. The authorization request identifies the requested user device information (e.g., "Location") and an identifier of the user device from which the information is to be collected (e.g., "User Device ID: 1234"). As shown by reference number 510, API gateway 240 includes a list of user device information requests for which consent is required. Assume that consent is required for location information. As shown by reference number 515, API gateway 240 requests consent for application device 230 to access location information from user device 210

Figure 5B:
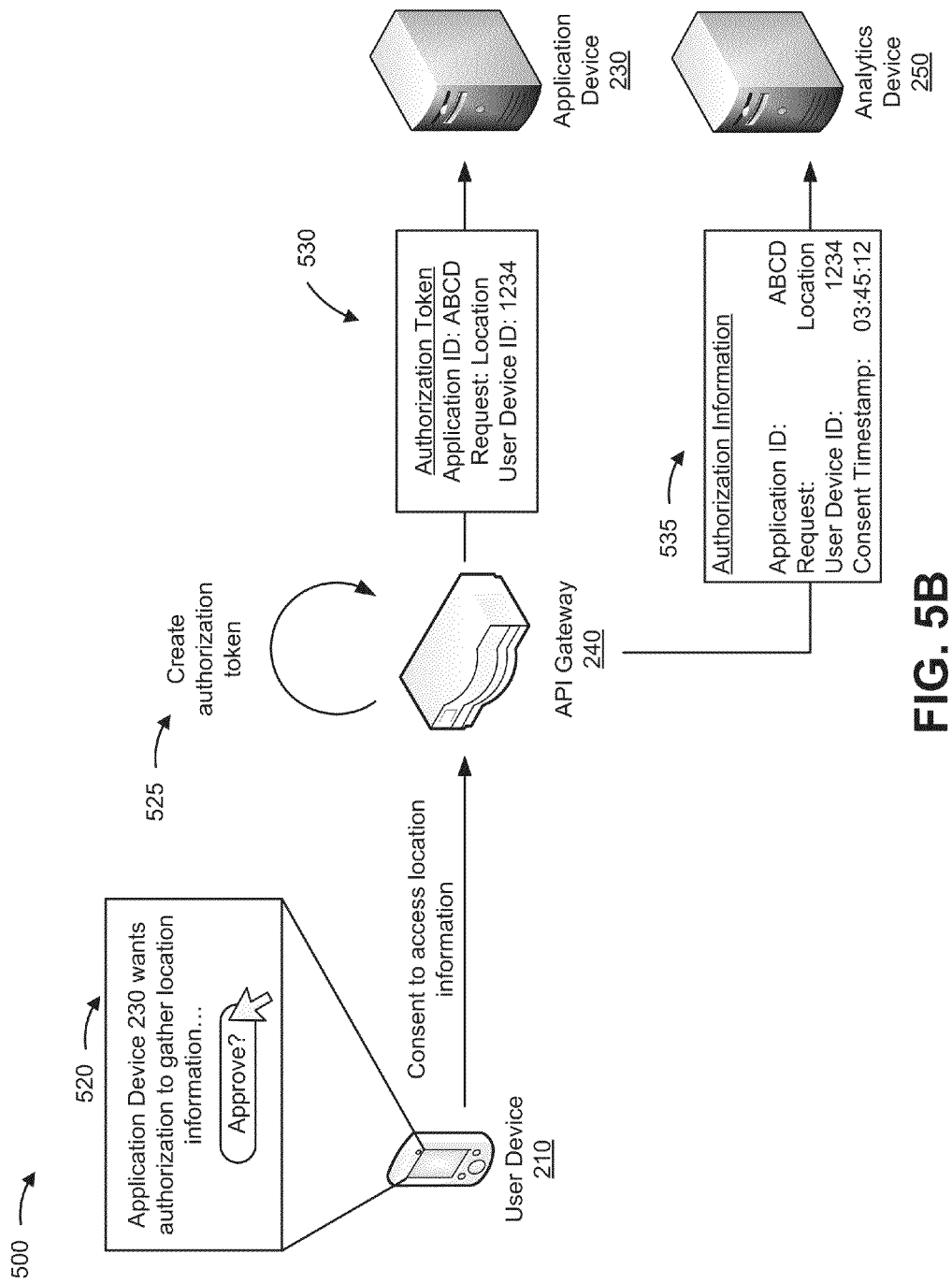

As shown in FIG. 5B, and by reference number 520, based on user interaction with the "Approve" button, user device 210 provides consent for application device 230 to access location information. As shown by reference number 525, API gateway 240 creates an authorization token and, as shown by reference number 530, provides the authorization token to application device 230. The authorization token includes information identifying application device 230 (e.g., "Application ID: ABCD"), the user device information to be provided, and user device 210. As shown by reference number 535, API gateway 240 provides authorization information to analytics device 250, such as an application device identifier (e.g., "Application ID: ABCD"), a user device information request identifier (e.g., that the request is for authorization to access location information), a user device identifier (e.g., "User Device ID: 1234"), and a timestamp at which consent was provided (e.g., "Consent Timestamp: 03:45:12"). Analytics device 250 may further process the authorization information prior to storing the authorization information as API information.

Figure 5C:
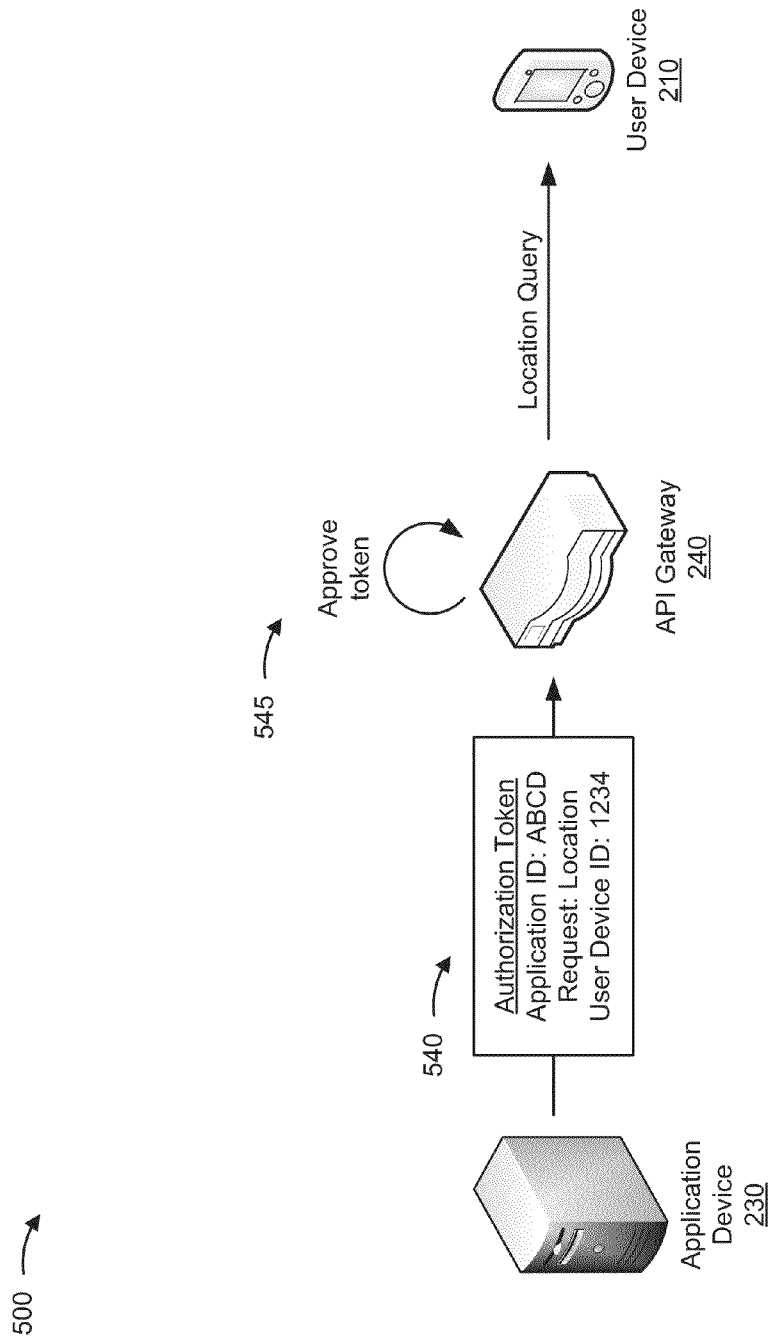

As shown in FIG. 5C, and by reference number 540, application device 230 provides the authorization token to API gateway 240 in order to receive the requested user device information. As shown by reference number 545, API gateway queries user device 210 to request location information.

Figure 5D:
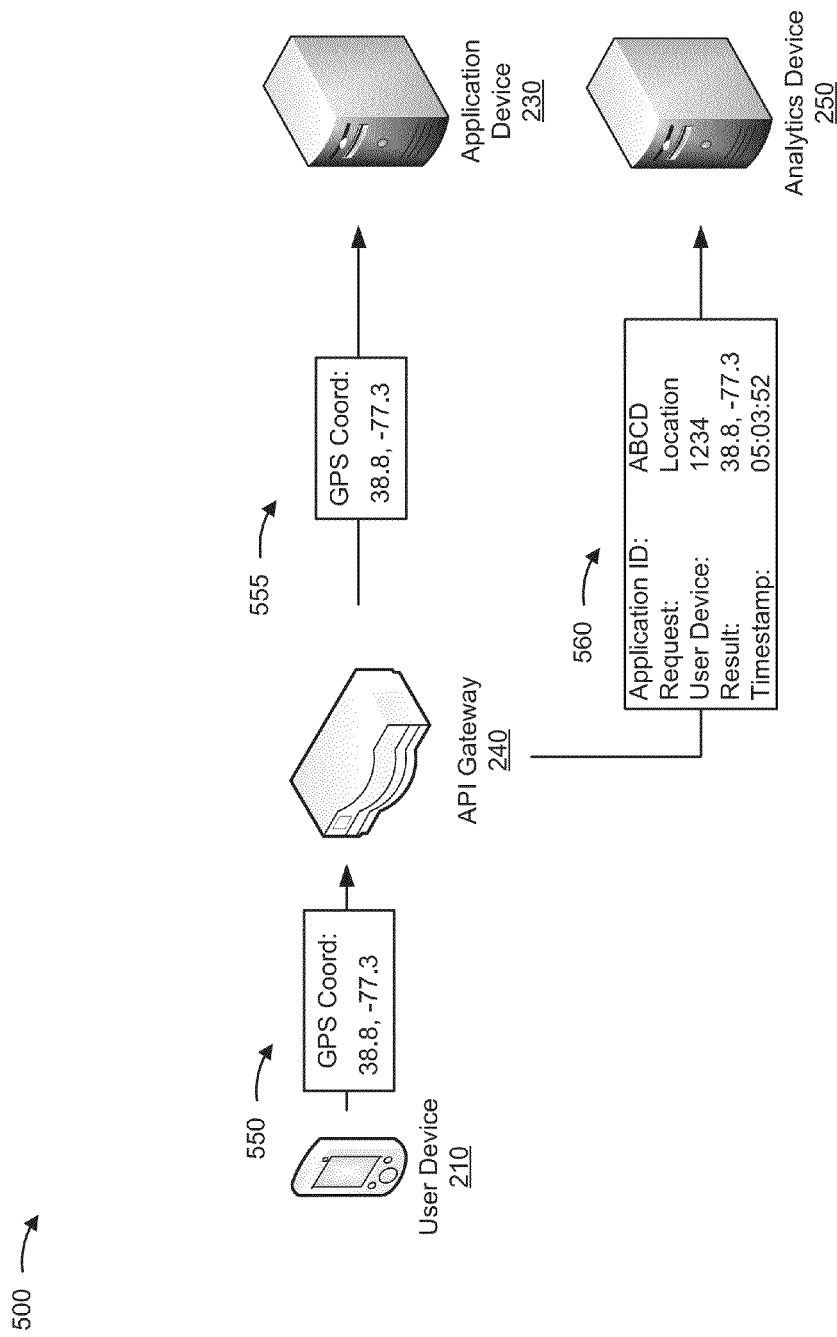

As shown in FIG. 5D, and by reference number 550, API gateway 240 receives location information from user device 210 (e.g., GPS coordinates). As shown by reference number 555, API gateway 240 provides the location information to application device 230. As shown by reference number 560, API gateway 240 provides transaction information to analytics device 250 to be stored as API information. The transaction information includes information identifying application device 230 (e.g., "Application ID: ABCD"), the requested information (e.g., location information), user device 210 (e.g., "User Device ID: 1234"), a result of the request (e.g., GPS coordinates "38.8, –77.3"), and a timestamp for the request (e.g., "05:03:52"). Analytics device 250 may process the transaction information prior to storing the transaction information as API information.

As indicated above, FIGS. 5A-5D are provided merely as an example. Other examples are possible and may differ from what was described with regard to FIGS. 5A-5D.

FIG. 6 is a flow chart of an example process 600 for providing analytics information based on API information and subscriber information. In some implementations, one or more process blocks of FIG. 6 may be performed by analytics device 250. Additionally, or alternatively, one or more process blocks of FIG. 6 may be performed by another device or a group of devices separate from or including analytics device 250, such user device 210, application device 230, API gateway 240, and/or subscriber information device 260.

As shown in FIG. 6, process 600 may include receiving a request for analytics information associated with a user device (block 610). For example, analytics device 250 may receive the request for analytics information from application device 230. In some implementations, analytics device 250 may receive the request from application device 230 via API gateway 240. The request may include a query (e.g., one or more parameters associated with determining the analytics information). Analytics information may refer to information determined based on processing, searching, collecting, filtering, and/or parsing API information and/or demographic information.

Analytics device 250 may receive the request for analytics information from application device 230 based on satisfaction of a pre-condition, in some implementations. For example, when API gateway 240 provides user device information, as discussed herein in connection with FIG. 4, application device 230 may request analytics information based on a result of the request for user device information.

A request for analytics information may be associated with a particular user device 210, in some implementations. For example, the request for analytics information may include information identifying user device 210. Additionally, or alternatively, the request for analytics information may include a request to identify one or more user devices 210 based on a query. For example, application device 230 may transmit the query, requesting that analytics device 250 identify one or more user devices matching one or more parameters, such as an API information parameter (e.g., a location, an application usage, etc.), a demographic information parameter (e.g., a user gender, a user age, a user payment method, etc.), or the like.

API gateway 240 may provide a user interface, based on information associated with application device 230, in some implementations. For example, API gateway 240 may determine that application device 230 is being operated by a retail store, and may provide a user interface, for requesting analytics information, designed for use by retail stores. In some implementations, API gateway 240 may provide an API (e.g., an interface specifying queries that may be made to analytics device 250) through which application device 230 may request analytics information.

As further shown in FIG. 6, process 600 may include retrieving stored API information associated with the request for analytics information (block 620). For example, analytics device 250 may retrieve API information associated with the one or more API information parameters. In some implementations, analytics device 250 may retrieve the API information from a storage device, such as a server, an external drive, or the like. The API information parameter may include a location parameter (e.g., a location where user device 210 has been, a location where user device 210 currently is, a location at which user device 210 used an application, etc.), a storage parameter (e.g., a quantity of stored music, a particular stored music file, a quantity of stored photographs, a quantity of stored data, a ratio of one type of data to another type of data in a user device memory, etc.), or the like. In some implementations, API information may be retrieved based on demographic information. For example, analytics device 250 may determine multiple user devices 210 that match a demographic information parameter, and may access API information to sort amongst the multiple user devices 210.

As further shown in FIG. 6, process 600 may include determining demographic information associated with the request for analytics information (block 630). For example, analytics device 250 may determine demographic information associated with one or more demographic information parameters. In some implementations, analytics device 250 may retrieve demographic information from subscriber information device 260. A demographic information parameter may include subscriber identity information (e.g., a name, a phone number, an address, a gender, a salary, an age, etc.), payment information, consumer preference information, or the like. In some implementations, demographic information may be retrieved based on API information. For example, analytics device 250 may determine multiple user devices 210 matching an API information parameter, and may use demographic information to sort amongst the multiple user devices 210.

As further shown in FIG. 6, process 600 may include determining analytics information based on the stored API information and the demographic information (block 640). For example, analytics device 250 may process the API information and the demographic information to determine analytics information. In some implementations, analytics information may include information filtered based on one or more API information parameters and/or demographic information parameters. For example, analytics device 250 may determine multiple user devices 210 that match a first API information parameter, a second API information parameter, and a demographic information parameter. Additionally, or alternatively, analytics information may include information produced from the API information and demographic information, such as a visualization, an information graphic, a chart, or the like, associated with user device 210.

As further shown in FIG. 6, process 600 may include providing the analytics information (block 650). For example, analytics device 250 may provide the analytics information to application device 230. In some implementations, analytics device 250 may provide the analytics information for display. Additionally, or alternatively, analytics device 250 may provide the analytics information for storage, processing (e.g., to be used for contextual advertising, preferential application services, etc.), etc. In some implementations, analytics device 250 may request and receive consent from user device 210 prior to providing information identifying user device 210 in the analytics information.

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
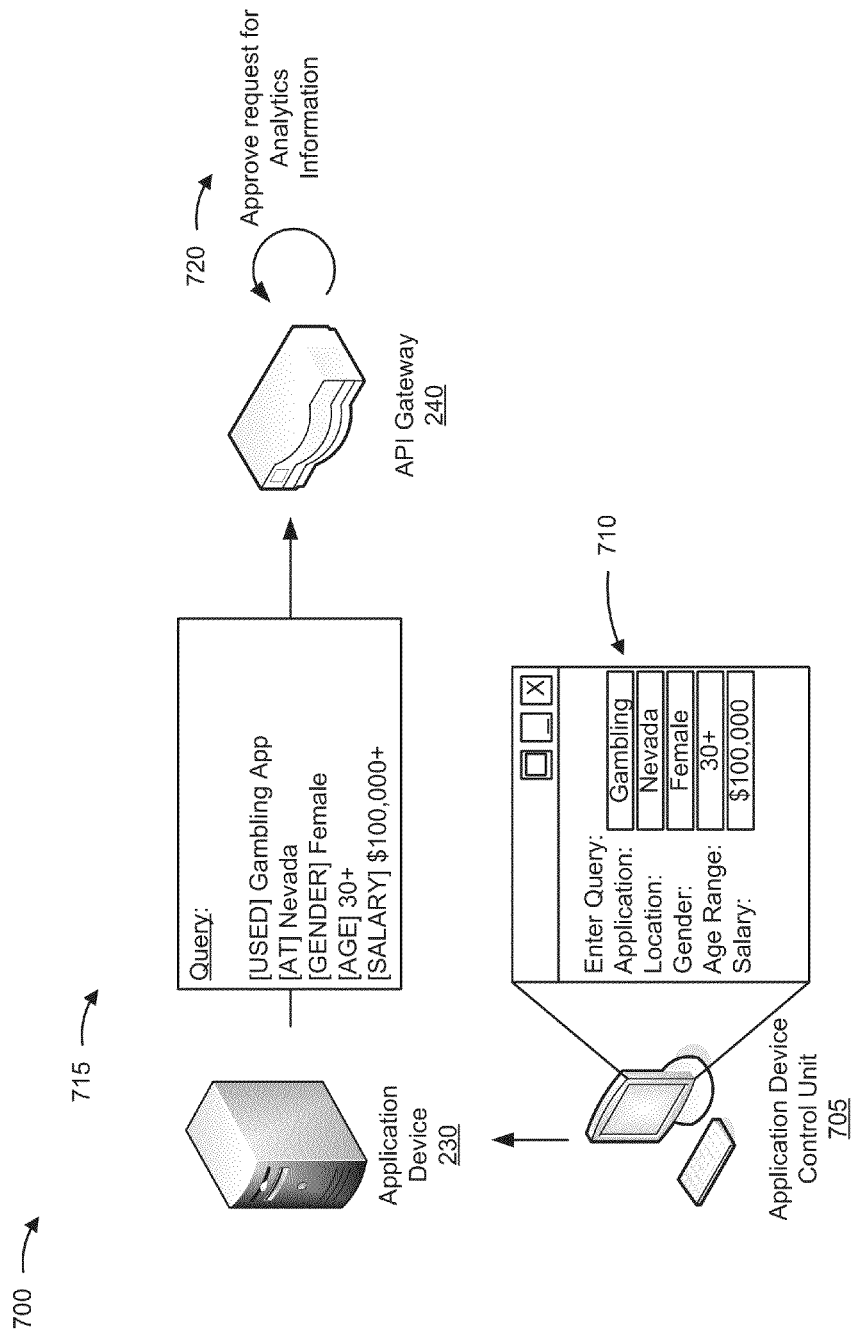
FIGS. 7A-7D are diagrams of an example implementation relating to the example process shown in FIG. 6.

FIGS. 7A-7D are diagrams of an example implementation 700 relating to process 600 shown in FIG. 6. As shown in FIG. 7A, example implementation 700 may include application device control unit 705 (e.g., a device for sending a request for analytics information). As shown by reference number 710, a user of application device control unit 705 enters parameters (e.g., values for search fields) to compose a query for analytics device 250 to use in determining analytics information. Assume that the query requests information identifying subscribers that used a gambling application in Nevada, that are female, that are over the age of thirty, and that have a salary of $100,000 or more per year. As shown by reference number 715, the query is sent to API gateway 240, and, as shown by reference number 720, API gateway 240 approves the request for analytics information.

Figure 7B:
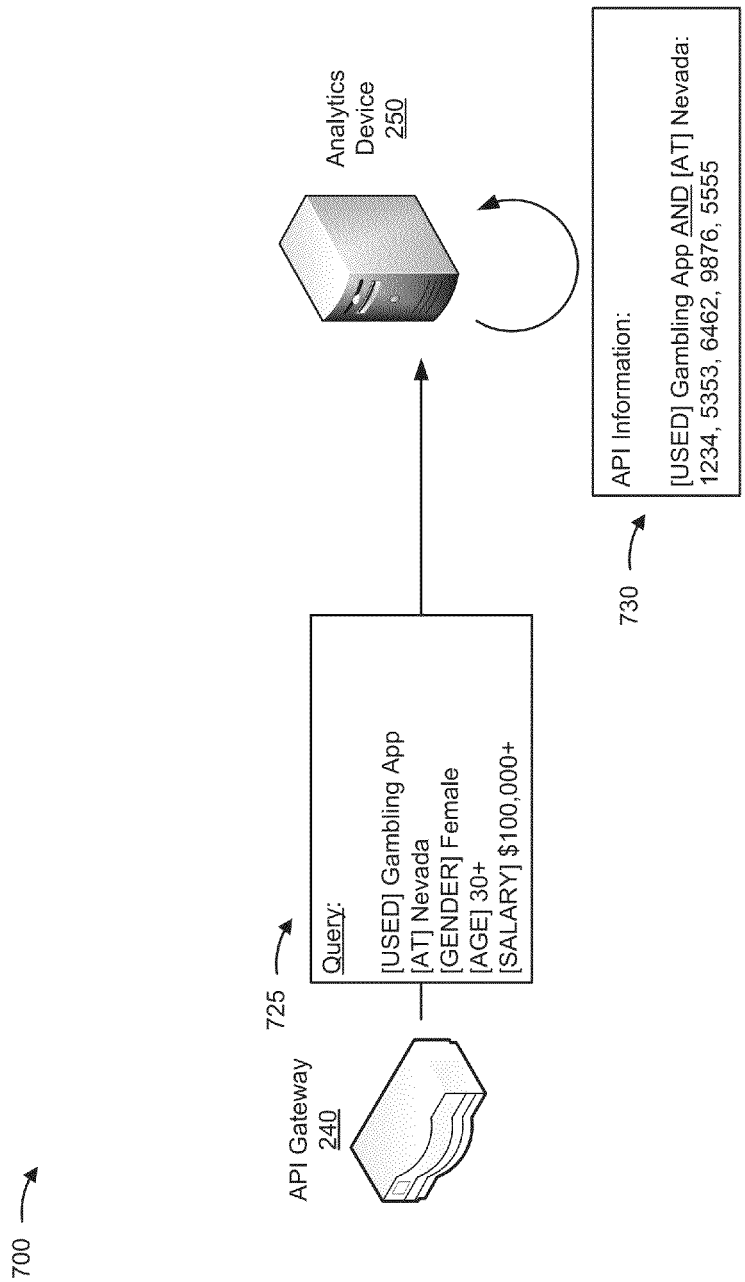

As shown in FIG. 7B, and by reference number 725, API gateway 240 sends the query to analytics device 250. As shown by reference number 730, analytics device 250 retrieves API information identifying user devices 210 (e.g., user devices identified as "1234," "5353," "6462," "9876," and "5555") that match the API information parameters of the query (e.g., the "[USED] Gambling App" parameter and the "[AT] Nevada" parameter).

Figure 7C:
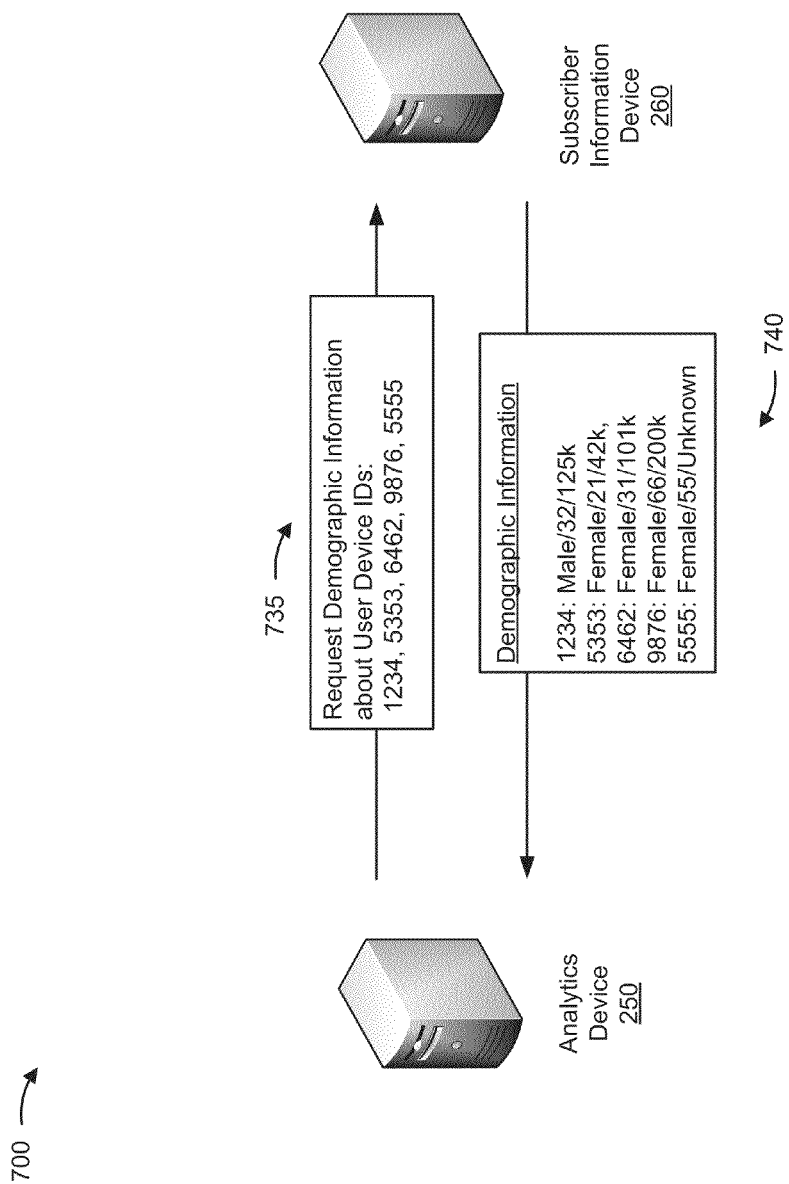

As shown in FIG. 7C, and by reference number 735, analytics device 250 requests demographic information associated with the user devices 210 that satisfied the API information parameters. As shown by reference number 740, subscriber information device 260 returns gender, age, and salary information for the identified user devices 210.

Figure 7D:
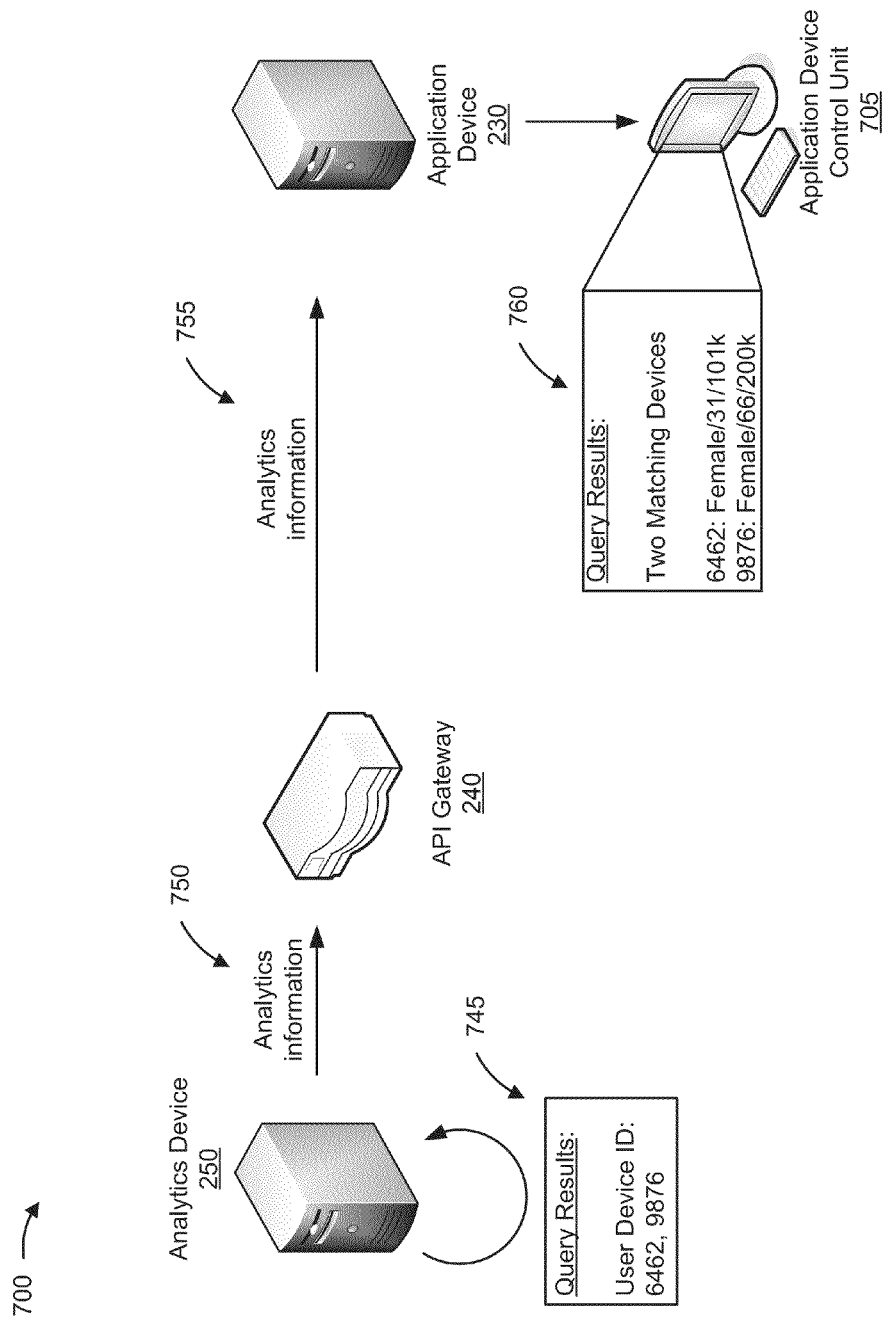

As shown in FIG. 7D, and by reference number 745, analytics device 250 processes the demographic information to identify the results of the query (e.g., user devices 210 that match both the API information parameters and the demographic information parameters, the user devices identified as "6462" and "9876"). As shown by reference number 750, analytics device 250 provides the analytics information to API gateway 240, which, as shown by reference number 755, routes the analytics information to application device 230. As shown by reference number 760, application device 230 displays the analytics information via application device control unit 705. The user of application device control unit 705 may then use the query results to target the identified user devices 210 (e.g., via contextual advertisements, prioritized usage of an application, etc.).

As indicated above, FIGS. 7A-7D are provided merely as an example. Other examples are possible and may differ from what was described with regard to FIGS. 7A-7D.

Implementations described herein may allow an analytics device to collect API information associated with authorization of applications and/or user device information and provide analytics information based on the collected API information and demographic information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
one or more processors to:
  receive a request for analytics information,
    the request including a search query that includes one or more application programming interface (API)

parameters and one or more demographic parameters for determining the analytics information,
the one or more API parameters identifying:
an application,
a type of the application,
a location associated with a user device that uses the application, or
storage information associated with the user device, and
the one or more demographic parameters identifying at least one of:
a user associated with the user device,
an age of the user,
a gender of the user,
a location associated with the user,
contact information associated with the user,
a salary associated with the user, or
purchase information associated with the user;
retrieve API information that identifies one or more user devices associated with the one or more API parameters included in the search query,
the API information including user device information gathered based on usage of the application by the one or more user devices;
determine demographic information associated with one or more users of the one or more user devices;
process the demographic information, based on the one or more demographic parameters included in the search query, to determine the analytics information,
the analytics information identifying at least one user device associated with a portion of the demographic information that matches the one or more demographic parameters and associated with a portion of the API information that matches the one or more API parameters; and
provide the analytics information based on determining the analytics information.

2. The device of claim 1, where the one or more processors are further to:
receive a request for authorization to access the user device information;
provide an authorization token associated with receiving access to the user device information;
store information associated with providing the authorization token; and
where the one or more processors, when retrieving the API information, are to:
retrieve the API information based on the information associated with providing the authorization token.

3. The device of claim 2, where the one or more processors are further to:
determine that consent is required from the user device based on the user device information;
receive consent from the user device; and
where the one or more processors, when providing the authorization token associated with receiving access to the user device information, are to:
provide the authorization token based on receiving consent from the user device.

4. The device of claim 1, where the one or more processors are further to:
receive another request, which includes an authorization token, for the user device information;
determine the user device information based on the other request;
provide the user device information;
store information associated with providing the user device information; and
where the one or more processors, when retrieving the API information, are to:
retrieve the API information based on the information associated with providing the user device information.

5. The device of claim 4, where the one or more processors, when determining the user device information based on the other request, are to:
determine that the user device information matches a particular result,
the particular result being associated with the request for the analytics information; and
where the one or more processors, when providing the analytics information, are to:
provide the analytics information based on determining that the user device information matches the particular result.

6. The device of claim 1, where the one or more processors are further to:
receive information associated with the usage of the application;
store the information associated with the usage of the application as stored API information; and
where the one or more processors, when retrieving the API information, are to:
retrieve the stored API information associated with the usage of the application.

7. The device of claim 1, where the one or more processors, when providing the analytics information, are to:
provide the analytics information for display.

8. The device of claim 1, where the one or more processors, when determining the demographic information, are to:
provide the API information to another device that stores the demographic information; and
receive the demographic information from the other device based on providing the API information to the other device.

9. A non-transitory computer-readable medium storing instructions, the instructions comprising:
one or more instructions that, when executed by one or more processors, cause the one or more processors to:
receive an analytics query for analytics information,
the analytics query identifying an application programming interface (API) parameter and a demographic parameter,
the API parameter identifying at least one of:
an application associated with an API,
a type of the application,
a location associated with a user device that uses the application, or
storage information associated with the user device, and
the demographic parameter identifying:
a user associated with the user device,
an age range of the user,
a gender of the user,
a location associated with the user,
contact information associated with the user,
a salary range associated with the user, or
purchase information associated with the user;
retrieve API information associated with the API parameter identified in the analytics query,
the API information being derived based on usage of the API, the API information identifying one or more user devices;

determine demographic information associated with one or more users of the one or more user devices;

process the demographic information, using the demographic parameter, to determine the analytics information, the analytics information identifying at least one user device associated with a portion of the demographic information that matches the demographic parameter and associated with a portion of the API information that matches the API parameter; and provide the analytics information.

10. The non-transitory computer-readable medium of claim 9, where the one or more instructions, when executed by the one or more processors, further cause the one or more processors to:

receive a request for authorization to access user device information associated with the user device of the one or more user devices;

provide an authorization token associated with receiving access to the user device information;

store information associated with providing the authorization token; and where the one or more instructions, that cause the one or more processors to retrieve the API information, are to:
retrieve the API information based on the information associated with providing the authorization token.

11. The non-transitory computer-readable medium of claim 10, where the one or more instructions, when executed by the one or more processors, further cause the one or more processors to:

request, from the user device, consent to provide authorization for access to the user device information;

receive consent from the user device; and where the one or more instructions, that cause the one or more processors to provide the authorization token associated with receiving access to the user device information, cause the one or more processors to:
provide the authorization token based on receiving the consent from the user device.

12. The non-transitory computer-readable medium of claim 10, where the one or more instructions, when executed by the one or more processors, further cause the one or more processors to:

receive another request, which includes the authorization token, to use the API;

determine the user device information based on the other request;

provide the user device information via the API; and where the one or more instructions, that cause the one or more processors to retrieve the API information, cause the one or more processors to:
retrieve the API information based on providing the user device information via the API.

13. The non-transitory computer-readable medium of claim 9, where the one or more instructions, that cause the one or more processors to provide the analytics information, cause the one or more processors to:

provide the analytics information to another device for display.

14. The non-transitory computer-readable medium of claim 9, where the one or more instructions, that cause the one or more processors to determine the demographic information, cause the one or more processors to:

determine the demographic information based on subscriber information stored by a home subscriber server (HSS).

15. A method, comprising:

receiving, by a device, a request for analytics information,
the request including an application programming interface (API) parameter and a demographic parameter,
the API parameter identifying at least one of:
an application associated with an API,
a type of the application,
a location associated with a user device that uses the application, or
storage information associated with the user device, and
the demographic parameter identifying at least one of:
a user associated with the user device,
an age or an age range of the user,
a gender of the user,
a location associated with the user,
contact information associated with the user,
a salary or a salary range associated with the user, or
purchase information associated with the user;

determining, by the device, API information derived from usage of the API by a plurality of user devices,
the API information identifying the plurality of user devices;

determining, by the device, demographic information corresponding to a plurality of users of the plurality of user devices;

processing, by the device, the demographic information using the demographic parameter;

determining, by the device, the analytics information based on processing the demographic information,
the analytics information identifying at least one user device associated with a portion of the demographic information that matches the demographic parameter and associated with a portion of the API information that matches the API parameter; and providing, by the device, the analytics information.

16. The method of claim 15, further comprising:
identifying the plurality of user devices based on the API parameter matching a parameter associated with the usage of the API by the plurality of user devices; and
where determining the API information comprises:
determining the API information based on identifying the plurality of user devices.

17. The method of claim 15, where the API information includes information associated with the user device, of the plurality of user devices, when the user device is using the application associated with the API.

18. The method of claim 15, further comprising:
determining that the user device, of the plurality of user devices, is using the application associated with the API;
storing information, associated with the usage of the application by the user device, as stored API information; and
where retrieving the API information comprises:
retrieving the stored API information associated with the usage of the application by the user device.

19. The method of claim 15, where receiving the request for the analytics information comprises:
receiving the request for the analytics information from a particular device; and where providing the analytics information comprises:

providing the analytics information to the particular device.

20. The method of claim 15, where providing the analytics information comprises:
providing the analytics information to another device.

* * * * *